US012210711B2

(12) United States Patent
Zheng et al.

(10) Patent No.: US 12,210,711 B2
(45) Date of Patent: Jan. 28, 2025

(54) DISPLAY PANEL AND DISPLAY DEVICE

(71) Applicant: Wuhan Tianma Micro-Electronics Co., Ltd., Wuhan (CN)

(72) Inventors: Yaofei Zheng, Wuhan (CN); Xiaofeng Guo, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 17 days.

(21) Appl. No.: 18/218,772

(22) Filed: Jul. 6, 2023

(65) Prior Publication Data
US 2024/0353963 A1 Oct. 24, 2024

(30) Foreign Application Priority Data

Apr. 20, 2023 (CN) .......................... 202310430592.X

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01)

(58) Field of Classification Search
CPC ........ G06F 3/041; G06F 3/044; G06F 3/0446; G06F 3/0412; G06F 3/014; H01L 51/52; H01L 27/32; G06K 9/00
See application file for complete search history.

(56) References Cited

U.S. PATENT DOCUMENTS

| 2018/0040675 A1* | 2/2018 | Zeng | .................. H10K 59/65 |
| 2023/0004258 A1* | 1/2023 | An | .................. G06F 3/0448 |
| 2023/0214036 A1* | 7/2023 | Kim | .................. G06F 3/0412 345/174 |

* cited by examiner

*Primary Examiner* — Michael A Faragalla
(74) *Attorney, Agent, or Firm* — Anova Law Group, PLLC

(57) ABSTRACT

Display panel and display device are provided. The display panel includes a base substrate; a display function layer, on a side of the base substrate, the display function layer including a plurality of subpixels arranged in an array along a first direction and a second direction, and the first direction intersects the second direction; and touch electrodes, on a side of the display function layer away from the base substrate, the touch electrodes including a plurality of touch wires intersecting to form a grid with a plurality of hollow parts, a vertical projection of a subpixel of the plurality of subpixels on a plane where the base substrate is located within a vertical projection of a hollow part of the plurality of hollow parts on the plane where the base substrate is located.

19 Claims, 12 Drawing Sheets

DISPLAY PANEL AND DISPLAY DEVICE

CROSS-REFERENCE TO RELATED APPLICATION

This application claims priority of Chinese Patent Application No. 202310430592.X, filed on Apr. 20, 2023, the entire contents of which are hereby incorporated by reference.

FIELD OF THE DISCLOSURE

The present disclosure generally relates to the field of display technology and, more particularly, relates to a display panel and a display device.

BACKGROUND

Among sensory organs of a human body, the visual organ (the eye) receives a largest volume of information. In both production and daily life, people need to make more and more use of rich visual information, so display technology plays a very important role in contemporary human society. Display technology has experienced rapid advancements, encompassing various technologies such as cathode ray tube technology (CRT), plasma display (PDP), liquid crystal display (LCD), and more recently, OLED display and micro LED display technology.

With an advancement of society and ever-growing demands for material comforts, display technology is swiftly progressing towards narrow borders, high contrast, high resolution, full-color display, low power consumption, high reliability, long life, and sleekness and lightweight design. Research on organic light-emitting display technology is also continuously advancing and deepening. An integration of touch functionality into existing organic light-emitting display (OLED) panels has been achieved. On the above basis, how to further improve a touch control performance of OLED panels has emerged as a key research direction in the display industry.

BRIEF SUMMARY OF THE DISCLOSURE

One aspect of the present disclosure provides a display panel. The display panel includes a base substrate; a display function layer, on a side of the base substrate, the display function layer including a plurality of subpixels arranged in an array along a first direction and a second direction, and the first direction intersects the second direction; and touch electrodes, on a side of the display function layer away from the base substrate, the touch electrodes including a plurality of touch wires intersecting to form a grid with a plurality of hollow parts, a vertical projection of a subpixel of the plurality of subpixels on a plane where the base substrate is located within a vertical projection of a hollow part of the plurality of hollow parts on the plane where the base substrate is located. Along the first direction or along the second direction, there is a situation where a distance between two adjacent subpixels is D1 and a minimum width of touch wires between the two adjacent subpixels is d1. Along the first direction or along the second direction, there is another situation where a distance between the two adjacent subpixels is D2, and a minimum width of the touch wires between the two adjacent subpixels is d2. D1>D2 and d1>d2.

Another aspect of the present disclosure provides a display device including a display panel. The display panel includes a base substrate; a display function layer, on a side of the base substrate, the display function layer including a plurality of subpixels arranged in an array along a first direction and a second direction, and the first direction intersects the second direction; and touch electrodes, on a side of the display function layer away from the base substrate, the touch electrodes including a plurality of touch wires intersecting to form a grid with a plurality of hollow parts, a vertical projection of a subpixel of the plurality of subpixels on a plane where the base substrate is located within a vertical projection of a hollow part of the plurality of hollow parts on the plane where the base substrate is located. Along the first direction or along the second direction, there is a situation where a distance between two adjacent subpixels is D1 and a minimum width of touch wires between the two adjacent subpixels is d1. Along the first direction or along the second direction, there is another situation where a distance between the two adjacent subpixels is D2, and a minimum width of the touch wires between the two adjacent subpixels is d2. D1>D2 and d1>d2.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated into and constitute a part of the present specification, illustrate embodiments of the present disclosure and together with the description, serve to explain principles of the present disclosure.

DETAILED DESCRIPTION

Various exemplary embodiments of the present disclosure will be described in detail with reference to the accompanying drawings. It should be noted that, unless specifically stated otherwise, a relative arrangement of components and steps, numerical expressions and numerical values set forth in the embodiments do not limit the scope of the present disclosure.

The following description of at least one exemplary embodiment is merely illustrative and is not intended to limit the present disclosure and application or use thereof.

Techniques, methods, and apparatus known to a person skilled in the art may not be discussed in detail, but where appropriate, such techniques, methods, and apparatus should be considered as part of the present specification.

In all examples shown and discussed herein, any specific value should be construed as illustrative only and not as a limitation. Accordingly, other examples of exemplary embodiments may have different values.

It will be apparent to a person skilled in the art that various modifications and variations can be made in the present disclosure without departing from the spirit or scope of the present disclosure. Accordingly, the present disclosure is intended to cover the modifications and variations of the present disclosure that fall within the scope of corresponding claims (claimed technical solutions) and equivalents thereof. It should be noted that, implementations provided in the embodiments of the present disclosure may be combined with each other if there is no contradiction.

It should be noted that similar numerals and letters refer to similar items in the following accompanying drawings. Once an item is defined in one accompanying drawing, the item does not require further discussion in subsequent accompanying drawings.

Figure 1:
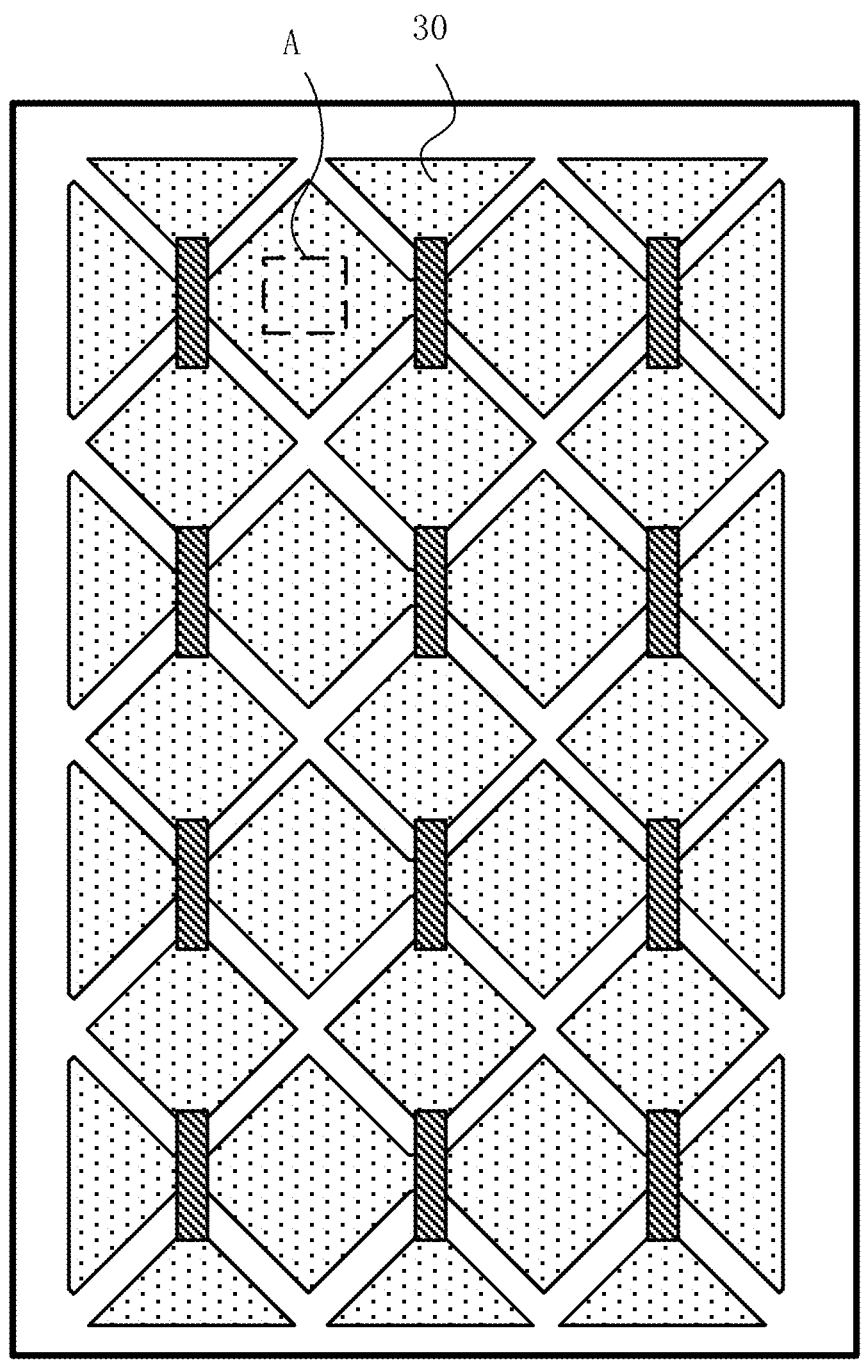
FIG. 1 illustrates a planar view of a display panel consistent with various embodiments of the present disclosure.
Figure 2:
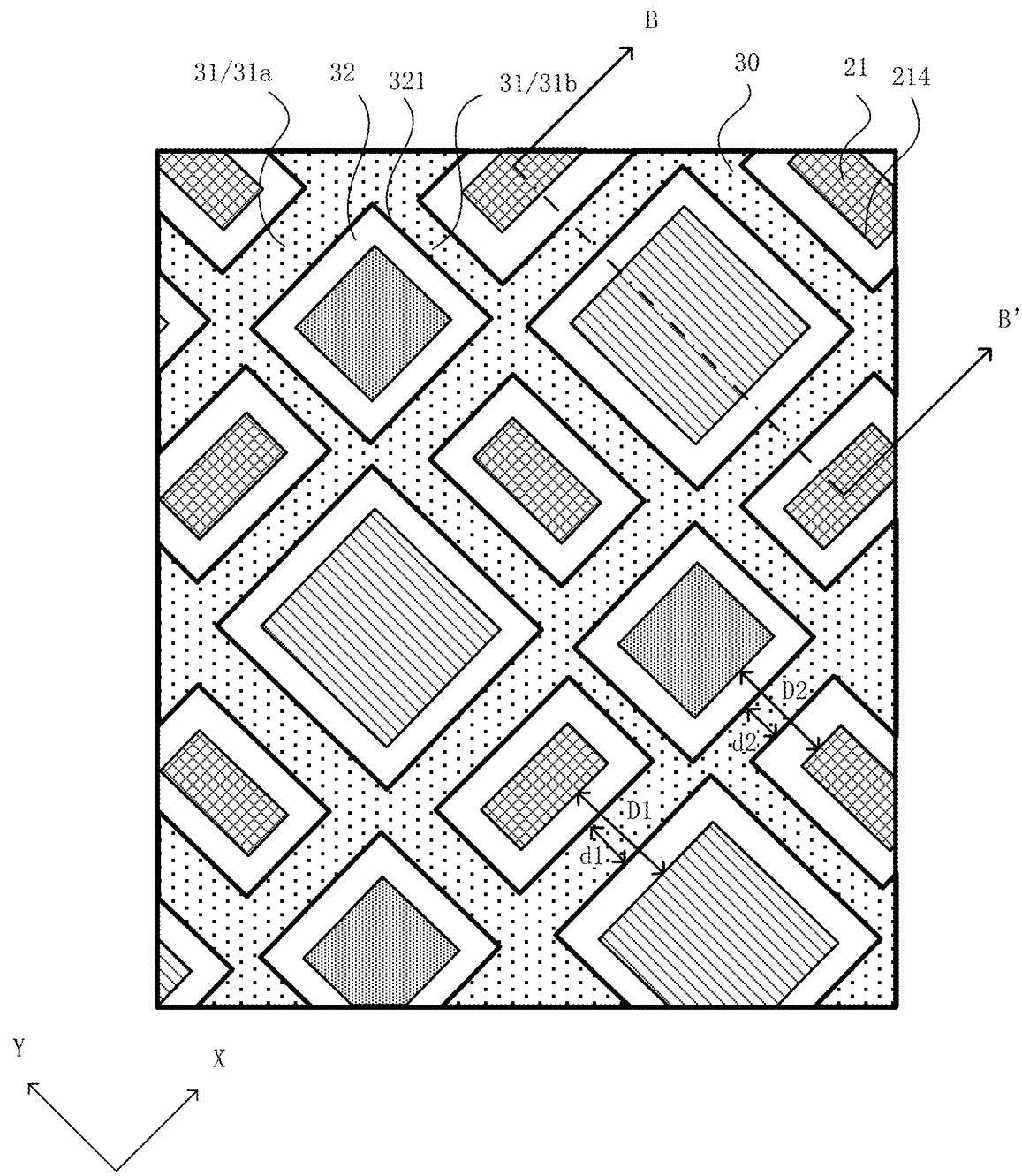
FIG. 2 illustrates an enlarged view of part A of the display panel described in FIG. 1.
Figure 3:
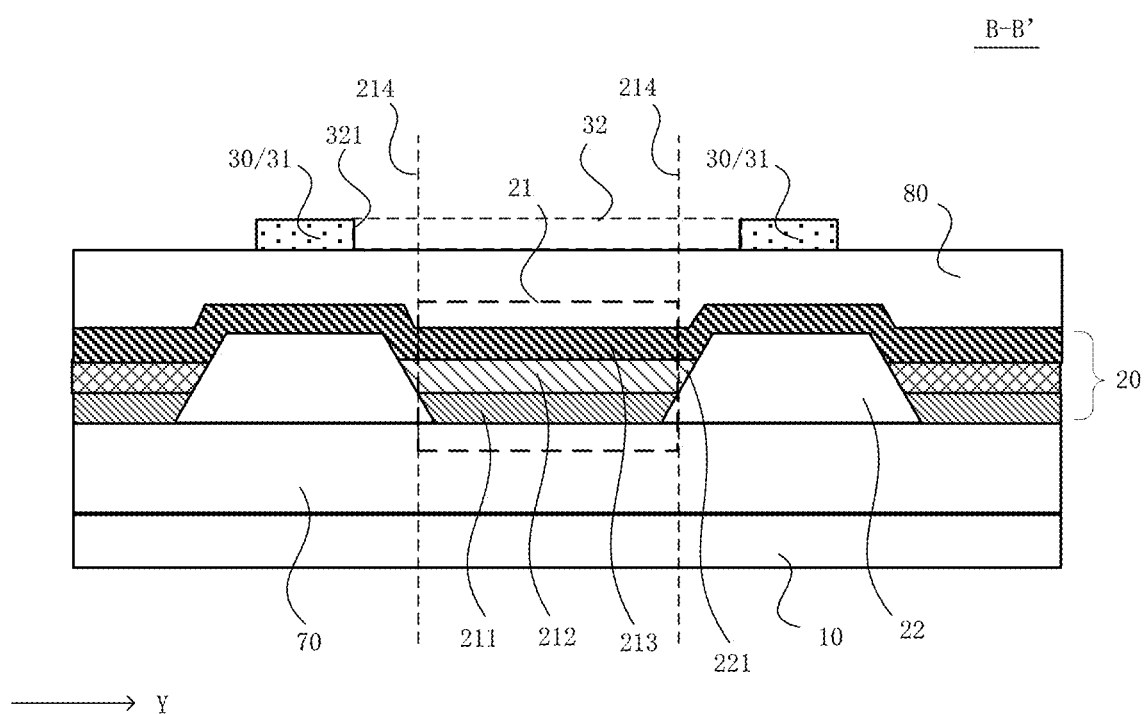
FIG. 3 illustrates a cross-sectional view of the display panel described in FIG. 2 along B-B'.

FIG. 1 illustrates a planar view of a display panel consistent with various embodiments of the present disclosure. FIG. 2 illustrates an enlarged view of part A of the display panel described in FIG. 1. FIG. 3 illustrates a cross-sectional view of the display panel described in FIG. 2 along B-B'. Referring to FIGS. 1-3, one embodiment provides a display panel including a base substrate 10. The base substrate 10 may be a rigid substrate and is made of glass. The base substrate 10 may also be a flexible substrate and is made of polyimide (PI), polycarbonate (PC), polyethylene terephthalate (PET) or the like.

The display panel also includes a display function layer 20 on a side of the base substrate 10. The display function layer 20 includes a plurality of subpixels 21 arranged in an array along a first direction X and a second direction Y. The first direction X intersects the second direction Y. Optionally, the first direction X is perpendicular to the second direction Y.

The display panel also includes an array layer 70 between the base substrate 10 and the display function layer 20. The array layer 70 includes wires and a pixel circuit, where the pixel circuit is electrically connected to subpixels 21. The pixel circuit is configured to control the subpixels 21 electrically connected to the pixel circuit, and the pixel circuit includes structures such as thin film transistors.

Optionally, in one embodiment, the display panel is an organic light emitting display panel, and the display panel further includes a pixel definition layer 22. A material of the pixel definition layer 22 includes an insulating material, the pixel definition layer 22 includes a plurality of second openings 221, and the subpixels 21 are in the plurality of second openings 221. A subpixel 21 includes a first electrode 211, a light-emitting layer 212 and a second electrode 213 which are sequentially stacked. Referring to FIG. 3, the pixel definition layer 22 includes a second opening 221 exposing the first electrode 21. The organic light-emitting material, i.e., the light-emitting layer 212 is filled in the second opening 221. The second opening 221 defines a region where a subpixel 21 emits light.

In actual use, the first electrode 211 can be set as an anode, and the second electrode 213 can be set as a cathode; or the first electrode 211 can be set as a cathode, and the second electrode 213 can be set as an anode. When an image is displayed, a bias voltage is applied between the first electrode 211 and the second electrode 213, cavities and electrons break through an interface energy barrier and migrate to the light-emitting layer 212. On the light-emitting layer 212, the electrons and cavities recombine to generate excitons, which are unstable and release energy to molecules of organic light-emitting substances in the light-emitting layer 212, causing the molecules to transition from a ground state to an excited state. The excited state is very unstable, and the excited molecules return to the ground state from the excited state, resulting in a radiative transition that produces luminescence.

The display panel further includes an encapsulation layers 80 on a side of the display function layer 20 away from the base substrate 10. The encapsulation layer 80 includes at least one inorganic encapsulation layer. Specifically, the encapsulation layer 80 is on a side of the second electrode 213 away from the base substrate 10. Optionally, the encapsulation layer 80 may include an inorganic encapsulation layer, an organic encapsulation layer and an inorganic encapsulation layer which are sequentially stacked. In other embodiments, the encapsulation layer 80 may include any number of stacked organic materials and inorganic materials according to actual production requirements, but at least one layer of organic material and at least one layer of inorganic material are alternately deposited, and a bottom layer and a top layer of the encapsulation layer 80 are composed of inorganic materials.

The display panel further includes touch electrodes 30 on the side of the display function layer 20 away from the base substrate 10. The touch electrodes 30 are on a side of the encapsulation layer 80 away from the base substrate 10. The touch electrodes 30 include a plurality of touch wires 31. The plurality of touch wires 31 intersect to form a grid structure with a plurality of hollow parts 32. A vertical projection of a subpixel 21 on a plane where the base substrate 10 is located within a vertical projection of a hollow part 32 on the plane where the base substrate 10 is located.

It can be understood that a touch wire of the plurality of touch wires 31 does not refer to a touch wire configured to connect a touch electrode to a bonding area of a driving chip but refers to a wire configured to form a touch electrode. Specifically, the touch wires 31 include touch wires 31a extending along the first direction X and touch wires 31b extending along the second direction Y. The touch wires intersect each other and are electrically connected to form a grid structure with the plurality of hollow parts 32. Vertical projection of the subpixels 21 on the plane where the base substrate 10 are located within vertical projections of the hollow parts 32 on the plane where the base substrate 10 is located. That is, the vertical projections of all touch wires 31 (including touch wires 31a and touch wires 31b) constituting the grid structure on the plane where the base substrate 10 is located within a vertical projection of the pixel definition layer 22 on the plane where the base substrate 10 is located.

It should be noted that FIG. 1 exemplarily shows that the touch electrodes 30 are configured to form mutual capacitance touch electrodes. In other embodiments, the touch electrodes 30 can also be configured to form self-capacitive touch electrodes, which are not specifically limited herein.

Along the first direction X or along the second direction Y, there is a situation where a distance between two adjacent subpixels 21 is D1, and a minimum width of touch wires 31 between the two adjacent subpixels 21 is d1. Along the first direction X or along the second direction Y, there is another situation where a distance between the two adjacent subpixels 21 is D2, and a minimum width of the touch wires 31 between the two adjacent subpixels 21 is d2. And D1>D2 and d1>d2.

Specifically, in the display panel, along the first direction X or along the second direction Y, there are a distance D1 between two adjacent subpixels 21, and a distance D2 between the two adjacent subpixels 21, where D1>D2. That is, along the first direction X or along the second direction Y, there are variations in distance between two adjacent subpixels 21 in the display panel. Specifically, distances between one part of two adjacent subpixels 21 are larger than distances between another part of two adjacent subpixels 21. Along the first direction X or along the second direction Y, the minimum width of touch wires 31 between two adjacent subpixels 21 with the distance of D1 is d1, and the minimum width of the touch wires 31 between two adjacent subpixels 21 with the distance of D2 is d2, where d1>d2. That is, along the first direction X or along the second direction Y, when a distance between two adjacent subpixels 21 in the display panel is relatively large, a minimum width of touch wires 31 between the two adjacent subpixels 21 is also set larger, which can increase widths of part of the touch wires 31 in the touch electrodes 30, and is conducive to reducing resistances of the touch electrodes 30, increasing a sensing amount of a touch signal, and improving a touch performance.

It can be understood that, along the first direction X or along the second direction Y, the distance between two adjacent subpixels 21 refers to a distance between the two adjacent subpixels 21 on an edge 214 of a vertical projection pattern on the plane where the base substrate 10 is located along the first direction X or along the second direction Y. The edge 214 of the vertical projection pattern of a subpixel 21 on the plane of the base substrate 10 refers to an edge of an overlapping portion of vertical projection patterns of the first electrode 211, the light-emitting layer 212 and the second electrode 213 on the plane where the base substrate 10 is located in the subpixel 21. It should be noted that a relevant description manner is also applicable to other embodiments, which is not repeated herein.

It should be noted that, FIG. 2 exemplarily shows that along the second direction Y, there are the distance D1 between two adjacent subpixels 21 and the minimum width of touch wires 31 between the two adjacent subpixels 21 is d1, and at a same time, along the second direction Y, there are the distance D2 between the two adjacent subpixels 21 and the minimum width of the touch wires 31 between the two adjacent subpixels 21 is d2. In other embodiments, along the first direction Y, it may also be that along the first direction X, there are the distance D1 between two adjacent subpixels 21 and the minimum width of touch wires 31 between the two adjacent subpixels 21 is d1, and at a same time, along the first direction X, there are the distance D2 between the two adjacent subpixels 21 and the minimum width of the touch wires 31 between the two adjacent subpixels 21 is d2. It may also be that along the first direction X, there are the distance D1 between two adjacent subpixels 21 and the minimum width of touch wires 31 between the two adjacent subpixels 21 is d1, and at a same time, along the second direction Y, there are the distance D2 between the two adjacent subpixels 21 and the minimum width of the touch wires 31 between the two adjacent subpixels 21 is d2. Or, along the second direction Y, there are the distance D1 between two adjacent subpixels 21 and the minimum width of touch wires 31 between the two adjacent subpixels 21 is d1, and at the same time, along the first direction X, there are the distance D2 between the two adjacent subpixels 21 and the minimum width of the touch wires 31 between the two adjacent subpixels 21 is d2.

Figure 4:
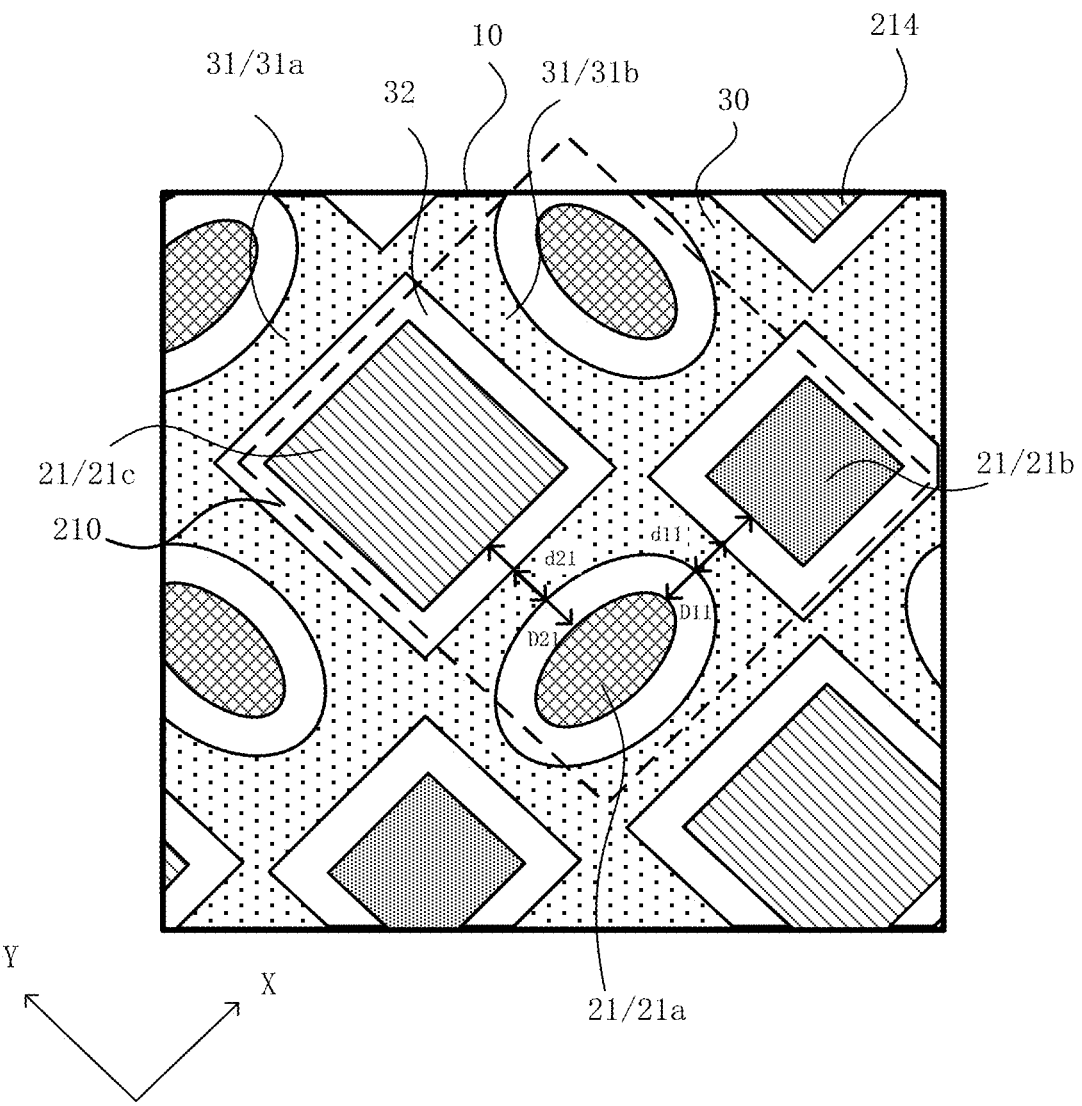
FIG. 4 illustrates a partial schematic diagram of another display panel consistent with various embodiments of the present disclosure.

FIG. 4 illustrates a partial schematic diagram of another display panel consistent with various embodiments of the present disclosure. Referring to FIG. 4, in some optional embodiments, the subpixels 21 includes first subpixels 21a, second subpixels 21b, and third subpixels 21c.

A length of at least one first subpixel 21a in the first direction X is greater than a length of the at least one first subpixel 21a in the second direction Y. That is, there is at least one first subpixel 21a in the display panel and a vertical projection pattern of the at least one first subpixel 21a on the plane where the base substrate 10 is located in the first direction X is longer than a vertical projection pattern of the at least one first subpixel 21a on the plane where the base substrate 10 is located in the second direction Y. Optionally, referring to FIG. 4, a vertical projection pattern of a first subpixel 21a on the plane where the base substrate 10 is located is an ellipse or a rectangle. In other embodiments, a vertical projection pattern of a first subpixel 21a on the plane where the base substrate 10 is located may also be in another shape, which is not repeated herein.

In the display panel, there is at least one first subpixel 21a, and a vertical projection pattern of the at least one first subpixel 21a on the plane where the base substrate 10 is located in the first direction X is longer than a vertical projection pattern of the at least one first subpixel 21a on the plane where the base substrate 10 is in the second direction Y. Along the first direction X, a subpixel 21 adjacent to the first subpixel 21a is a second subpixel 21b, and along the second direction Y, a subpixel 21 adjacent to the first subpixel 21b is a third subpixel 21c.

A distance between the first subpixel 21a and an adjacent second subpixel 21b thereof in the first direction X is D11, and a distance between the first subpixel 21a and an adjacent third subpixel 21c thereof in the second direction Y The spacing is D21. A minimum width of touch wires 31 between the first subpixel 21a and the adjacent second subpixel 21b thereof in the first direction X is d11, and a minimum width of the touch wires 31 between the first subpixel 21a and the adjacent third subpixel 21c thereof in the second direction Y is d21. D11<D21 and d11<d21.

Specifically, there is at least one first subpixel 21a in the display panel, a vertical projection pattern of a first subpixel 21a on the plane where the base substrate 10 is located in the first direction X that is longer than a vertical projection pattern of the first subpixel 21a on the plane where the base substrate 10 is located in the second direction Y, so that a distance between the first subpixel 21a and an adjacent second subpixel 21b thereof in the first direction X is smaller than a distance between the first subpixel 21a and an adjacent third subpixel 21c thereof in the second direction Y. Accordingly, a minimum width of touch wires 31 between the first subpixel 21a and the adjacent second subpixel 21b thereof in the first direction X is shorter than a minimum width of touch wires 31 between the first subpixel 21a and the adjacent third subpixels 21c thereof in the second direction Y. That is, when there exists that an vertical projection pattern of at least one first subpixel 21a on the plane where the base substrate 10 is located in the first direction X is longer than an vertical projection pattern of the at least one first subpixel 21a on the plane where the base substrate 10 is located in the second direction Y, a distance between the first subpixel 21a and an adjacent third subpixel 21c thereof in the second direction Y is relatively large, so that a minimum width of touch wires 31 between the first subpixel 21a and the adjacent third subpixel 21c thereof is also set larger, which can increase widths of part of the touch wires 31 in the touch electrodes 30, and is conducive to reducing resistances of the touch electrodes 30, increasing a sensing amount of a touch signal, and improving a touch performance.

It can be understood that, in other embodiments, there may exist that in the display panel, a length of a vertical projection pattern of a first subpixel 21a in the first direction X on the plane where the base substrate 10 is located is smaller than a length of a vertical projection pattern of the first subpixel 21a in the second direction Y on the length. A distance between the first subpixel 21a and an adjacent second subpixel 21b thereof in the first direction X is greater than a distance between the first subpixel 21a and an adjacent third subpixel 21c thereof in the second direction Y, so that a minimum width of touch wires 31 between the first subpixel 21a and the adjacent second subpixel 21b thereof in the first direction X can be set to be larger than that a minimum width of touch wires 31 between the first subpixel 21a and the adjacent the third subpixels 21c thereof in the second direction Y, which is not repeated herein. For configurations of specific structures, reference may be made to the above embodiments.

It should be noted that naming of subpixels 21 in the embodiment is only for clearly indicating a positional relationship of the subpixels 21. The first subpixel 21a, the second subpixel 21b and the third subpixel 21c may be subpixels 21 with a same light emission color, and the first subpixel 21a, the second subpixel 21b and the third subpixel 21c may also have subpixels 21 with different light emission colors, which is not specifically limited herein.

Referring to FIG. 4, in some optional embodiments, the display panel includes a plurality of pixel units 210, and a pixel unit of the plurality of pixel units 210 includes two first subpixels 21a, one second subpixel 21b and one third subpixel 21c.

In the pixel unit of the plurality of pixel units 210, the second subpixel 21b and one first subpixel 21a are arranged along the first direction X and the second subpixel 21b and the other first subpixel 21a are arranged along the second direction Y. The third subpixel 21c and one first subpixel 21a are arranged along the first direction X, and the third subpixel 21c is arranged along the second direction Y with the other first subpixel 21a.

It should be noted that the embodiment exemplarily shows an arrangement of the subpixels 21 in the pixel unit 210. In other embodiments, the subpixels 21 in the pixel unit 210 can also adopt other arrangements, which are not repeated herein.

Referring to FIG. 4, in some optional embodiments, the first subpixel 21a, the second subpixel 21b, and the third subpixel 21c are different ones of the red subpixel, the blue subpixel, and the green subpixel. Exemplarily, the first subpixel 21a is a green subpixel, the second subpixel 21b is a red subpixel, and the third subpixel 21c is a blue subpixel. In other embodiments, the first subpixel 21a, the second subpixel 21b, and the third subpixel 21c can be set according to actual production needs, which is not repeated herein.

Figure 5:
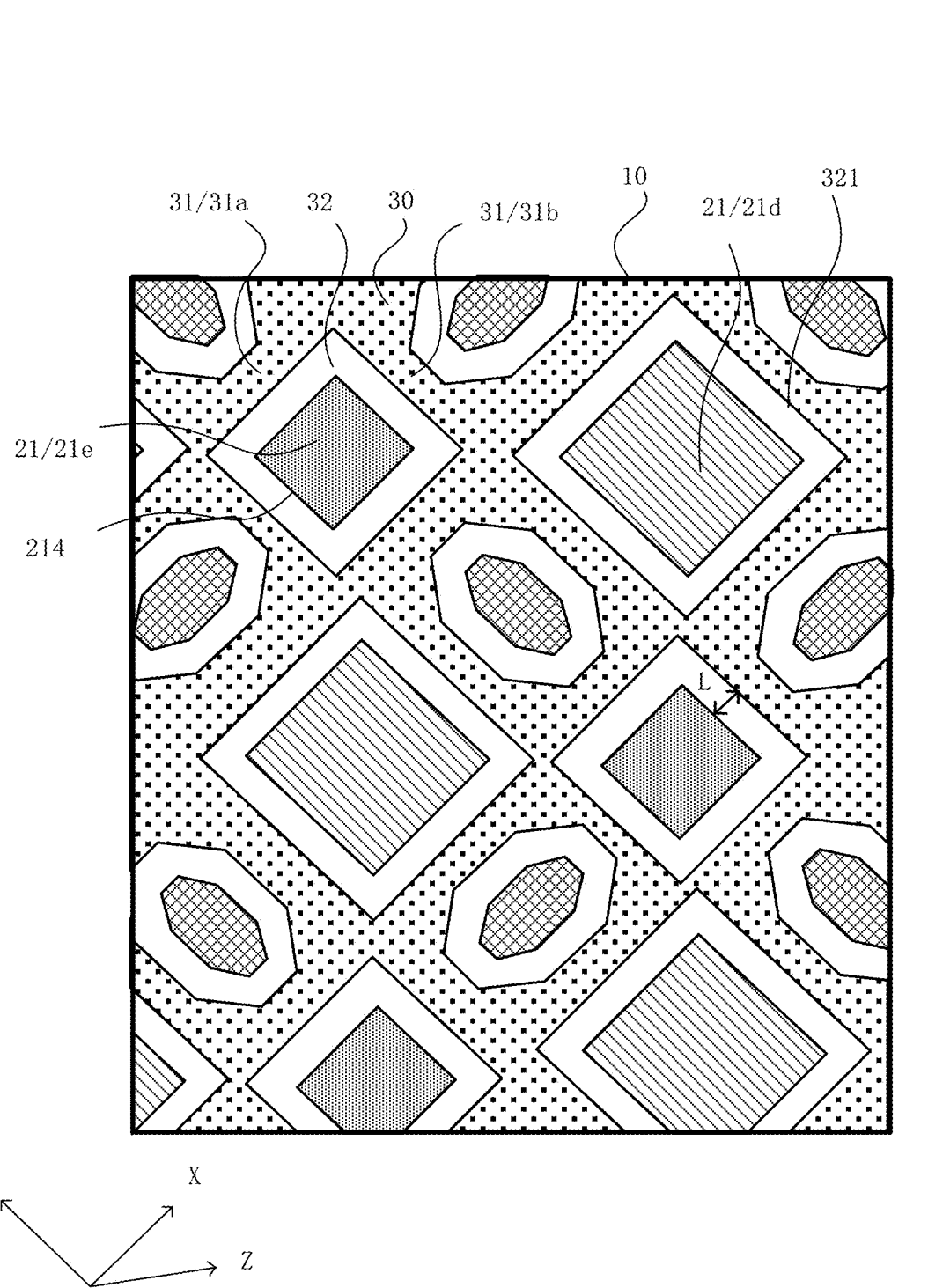
FIG. 5 illustrates another enlarged view of part A of the display panel described in FIG. 1.
Figure 6:
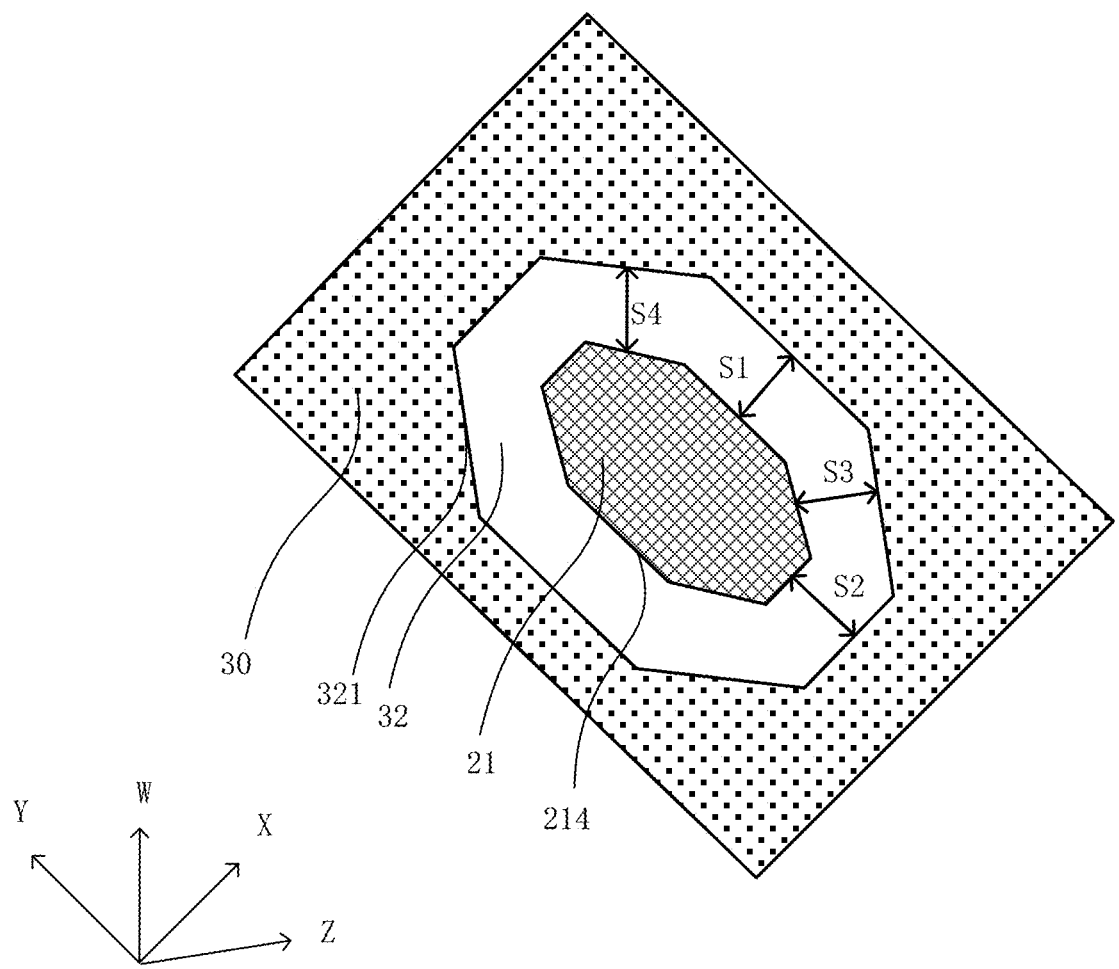
FIG. 6 illustrates an enlarged view of a subpixel in the display panel described in FIG. 1.

FIG. 5 illustrates another enlarged view of part A of the display panel described in FIG. 1. FIG. 6 illustrates an enlarged view of a subpixel in the display panel described in FIG. 1. Referring to FIG. 1, FIG. 5 and FIG. 6, in some optional embodiments, along the first direction X, a distance between an edge 214 of a vertical projection pattern of a subpixel 21 on the plane where the base substrate 10 is located and an edge 321 of a vertical projection pattern of a corresponding hollow part 32 on the plane where the base substrate 10 is located is S1.

Along the second direction Y, a distance between an edge 214 of a vertical projection pattern of the subpixel 21 on the plane where the base substrate 10 is located and an edge 321 of a vertical projection pattern of a corresponding hollow part 32 on the plane where the base substrate 10 is located is S2.

Along a third direction Z, a distance between an edge 214 of a vertical projection pattern of the subpixel 21 on the plane where the base substrate 10 is located and an edge 321 of a vertical projection pattern of a corresponding hollow part 32 on the plane where the base substrate 10 is located is S3. The third direction Z intersects the first direction X, and the third direction Z intersects the second direction Y, and S1=S2=S3.

Specifically, in the display panel, there are at least one subpixel 21 and a distance between an edge 214 of a vertical projection pattern of a subpixels 21 on the plane where the base substrate 10 is located and an edge 321 of a vertical projection pattern of a corresponding hollow part on the plane where the base substrate 10 is located along the first direction X, a distance between the edge 214 and the edge 321 along the second direction Y and a distance between the edge 214 and the edge 321 along the third direction Z are equal, so that in the first direction X, in the second direction Y and in the third direction Z, influences of touch wires 31 around the corresponding hollow part 32 in the touch electrodes 30 on light emitted by the subpixels 21 corresponding to the hollow part 32 tend to be same. Effects of the light emitted by the subpixel 21 tend to be same in the first direction X, in the second direction Y and in the third direction Z, which is conducive to improving a display effect.

It should be noted that a correspondence between a subpixel 21 and a hollow part 32 means that a vertical projection of a certain subpixel 21 on the plane where the base substrate 10 is located within a vertical projection of a certain hollow part 32 on the plane where the base substrate 10 is located, so that the subpixel 21 corresponds to the hollow part 32. It should be noted that the relevant correspondence is also applicable in other embodiments, which is not repeated herein.

In some optional embodiments, along each direction parallel to the plane where the base substrate is located, there exists that along at least two directions, distances between an edge of a vertical projection pattern of a subpixel on the plane where the base substrate is located and an edge of a vertical projection pattern of a corresponding hollow part on the plane where the base substrate is located are different. That is, along part of directions parallel to the plane where the base substrate is located, a distance between an edge of a vertical projection pattern of a subpixel on the plane where the base substrate is located and an edge of a vertical projection pattern of a corresponding hollow part on the plane where the base substrate is located can be set to be reduced, so that widths of part of touch wires in the touch electrodes can be increased, which is conducive to reducing resistances of the touch electrodes, increasing a sensing amount of a touch signal, and improve a touch performance.

Exemplarily, referring to FIG. 1, FIG. 5 and FIG. 6, along a fourth direction W, a distance between an edge 214 of a vertical projection pattern of a subpixel 21 on the plane where the base substrate 10 is located and an edge 321 of a vertical projection pattern of a corresponding hollow part 32 on the plane where the base substrate 10 is located is S4. S4 and S3 can be different. Specifically, due to reasons such as the production process, there exists that, at a same viewing angle, a color shift when the display panel is viewed along the fourth direction W is different from a color shift when the display panel is viewed along the third direction Z. Along the third direction Z and the fourth direction W, distances between an edge of a vertical projection pattern of part of subpixels 21 on the plane where the base substrate 10 is located and an edge of the vertical projection pattern of corresponding hollow parts 32 on the plane where the base substrate 10 is located can be set differently to improve a problem that a color shift when the display panel is viewed along the fourth direction W is different from a color shift when the display panel is viewed along the third direction Z at a same viewing angle.

It should be noted that the embodiment exemplarily shows that along the third direction and along the fourth direction, a distance between an edge of a vertical projection pattern of a subpixel on the plane where the base substrate is located and an edge of a vertical projection pattern of a corresponding hollow part on the plane where the base substrate is located are not equal. In other embodiments, according to actual needs, in other two different directions of all directions parallel to the plane where the base substrate is located, distances between an edge of a vertical projection pattern of the subpixel on the plane where the base substrate is located and an edge of a vertical projection pattern of the corresponding hollow part on the plane where the base substrate is located can be set differently, or along a plurality of directions, distances between an edge of a vertical projection pattern of the subpixel on the plane where the base substrate is located and an edge of a vertical projection pattern of the corresponding hollow part on the plane where the base substrate is located can be set differently, which are not repeated herein.

Referring to FIG. 1, FIG. 5 and FIG. 6, in some optional embodiments, the hollow parts 32 correspond to the subpixels 21 one by one. A shape of an edge 214 of a vertical projection pattern of a subpixel 21 on the plane where the base substrate 10 is located is same as a shape of an edge 321 of a vertical projection pattern of a corresponding hollow parts32 on the plane where the base substrate 10 is located, which is convenient to arrange that a distance between an edge 214 of a vertical projection pattern of the subpixel 21 on the plane where the base substrate 10 is located and an edge 321 of a vertical projection pattern of the corresponding hollow part 32 on the plane where the base substrate 10 is located along the first direction X, a distance between the edge 214 and the edge 321 along the second direction Y and a distance between the edge 214 and the edge 321 along the third direction Z are same.

It can be understood that a shape of an edge 214 of a vertical projection pattern of a subpixel 21 on the plane of the base substrate 10 may be geometrically similar to a shape of an edge 321 of a vertical projection pattern of a corresponding hollow part 32 on the plane where the base substrate 10 is located. Exemplarily, the edge 214 of the vertical projection pattern of the subpixel 21 on the plane where the base substrate 10 is located is octagonal, and the shape of the edge 321 of the vertical projection pattern of the corresponding hollow part 32 on the plane where the base substrate 10 is located is also similarly octagonal in shape.

A vertical projection pattern of a subpixel 21 on the plane where the base substrate 10 is located is a polygon. Exemplarily, a vertical projection pattern of a subpixel 21 on the plane where the base substrate 10 is located may be a square, a hexagon, or an octagon. In other embodiments, a vertical projection pattern of a subpixel 21 on the plane where the base substrate 10 is located can also be arranged in other shapes according to actual production needs, which is not repeated herein.

Referring to FIG. 1, FIG. 5 and FIG. 6, in some optional embodiments, along all directions parallel to the plane where the base substrate 10 is located, distances between an edge 214 of a vertical projection pattern of a subpixel 21 on the plane where the base substrate is located and an edge 321 of a vertical projection pattern of a corresponding hollow part 32 on the plane where the base substrate is located are same. That is, in all directions parallel to the plane where the base substrate 10 is located, influences of touch wires 31 around the hollow part 32 in the touch electrodes 30 on light emitted by the subpixel 21 corresponding to the hollow part 32 tend to be same. In all directions parallel to the plane where the base substrate 10 is located, effects of light emitted by the subpixel 21 tend to be same, which is conducive to improving a display effect.

Referring to FIG. 1 and FIG. 5, in some optional embodiments, Subpixels 21 include fourth subpixels 21d and fifth subpixels 21e.

An area of a vertical projection pattern of a fourth subpixel 21d on the plane where the base substrate 10 is located is larger than an area of a vertical projection pattern of a fifth subpixel 21e on the plane where the base substrate 10 is located.

An area of a vertical projection pattern of a hollow parts 32 corresponding to the fourth subpixel 21d on the plane where the base substrate 10 is located is larger than an area of a vertical projection pattern of the hollow part 32 corresponding to the fifth subpixel 21e on the plane where the base substrate 10 is located.

Specifically, subpixels 21 in the display panel include fourth subpixels 21d and fifth subpixel 21es. An area of a vertical projection pattern of a fourth subpixel 21d on the plane where the substrate 10 is located is larger than an area of a vertical projection pattern of a fifth subpixel 21e on the plane where the substrate 10 is located. Accordingly, an area of a vertical projection pattern of a hollow part 32 corresponding to the fourth subpixel 21d on the plane where the base substrate 10 is located is larger than an area of a vertical area of a hollow part 32 corresponding to the fifth subpixel 21e on the plane where the base substrate 10 is located. That is, there are subpixels 21 of different sizes in the display panel including smaller sizes, and sizes of the corresponding hollow parts 32 for the smaller-sized subpixels in the display panel are also set to be smaller, so that widths of touch wires 31 forming hollow parts 32 can be increased, which is conducive to reducing resistances of touch electrodes 30, increasing a sensing amount of a touch signal, and improving a touch performance.

It should be noted that naming of subpixels 21 in the embodiment is only for clearly indicating subpixels 21 of different sizes. The fourth subpixels 21d and the fifth subpixels 21e may be subpixels 21 with a same light emitting color. The fourth subpixels 21d and the fifth subpixels 21e may also be subpixels 21 with different light emitting colors, which are not specifically limited herein.

Referring to FIG. 1 and FIG. 5, in some optional embodiments, a distance between an edge 214 of the vertical projection pattern of each subpixel 21 on the plane where the base substrate 10 is located and an edge 321 of the vertical projection pattern of a corresponding hollow part 32 on the plane where the base substrate 10 is located is same.

Specifically, when there are subpixels 21 of different sizes in the display panel, accordingly, sizes of the hollow parts 32 corresponding to subpixels 21 with smaller sizes in the display panel are also set to be smaller, so that widths of touch wires 31 forming the hollow parts 32 can be increased, and a distance between an edge 214 of the vertical projection pattern of each subpixel 21 on the plane where the base substrate 10 is located and an edge 321 of the vertical projection pattern of a corresponding hollow part 32 on the plane where the base substrate 10 is located is same. That is, touch wires 31 are centered between two adjacent subpixels 21, so that influences of the touch wires 31 on light emitted by the two adjacent subpixels 21 tends to be same and an effect of light emitted by each subpixel 21 tends to be same, which is conducive to improving a display effect.

Referring to FIG. 1 and FIG. 5, in some optional embodiments, a distance between an edge 214 of a vertical projection pattern of each subpixel 21 on the plane where the base substrate 10 is located and an edge 321 of a vertical projection pattern of a corresponding hollow part 32 on the plane where the base substrate 10 is located is L, and 8 µm≤L≤10 µm.

Specifically, a distance between an edge 214 of a vertical projection pattern of each subpixels 21 on the plane where the base substrate 10 is located and an edge 321 of a vertical projection pattern of a corresponding hollow part 32 on the plane where the base substrate 10 is located is greater than or equal to 8 µm, so that an influence of touch wires 31 on light emitted by the adjacent subpixel 21 is reduced, which is conducive to improving a display effect. A distance between an edge 214 of a vertical projection pattern of each subpixel 21 on the plane where the base substrate 10 is located and an edge 321 of a vertical projection pattern of a corresponding hollow part 32 on the plane where the base substrate 10 is located is smaller than or equal to 10 µm, so that widths of touch wires 31 forming the hollow part 32 can be increased, which is conducive to reducing resistances of touch electrodes 30, increasing a sensing amount of a touch signal and improving a touch performance.

Figure 7:
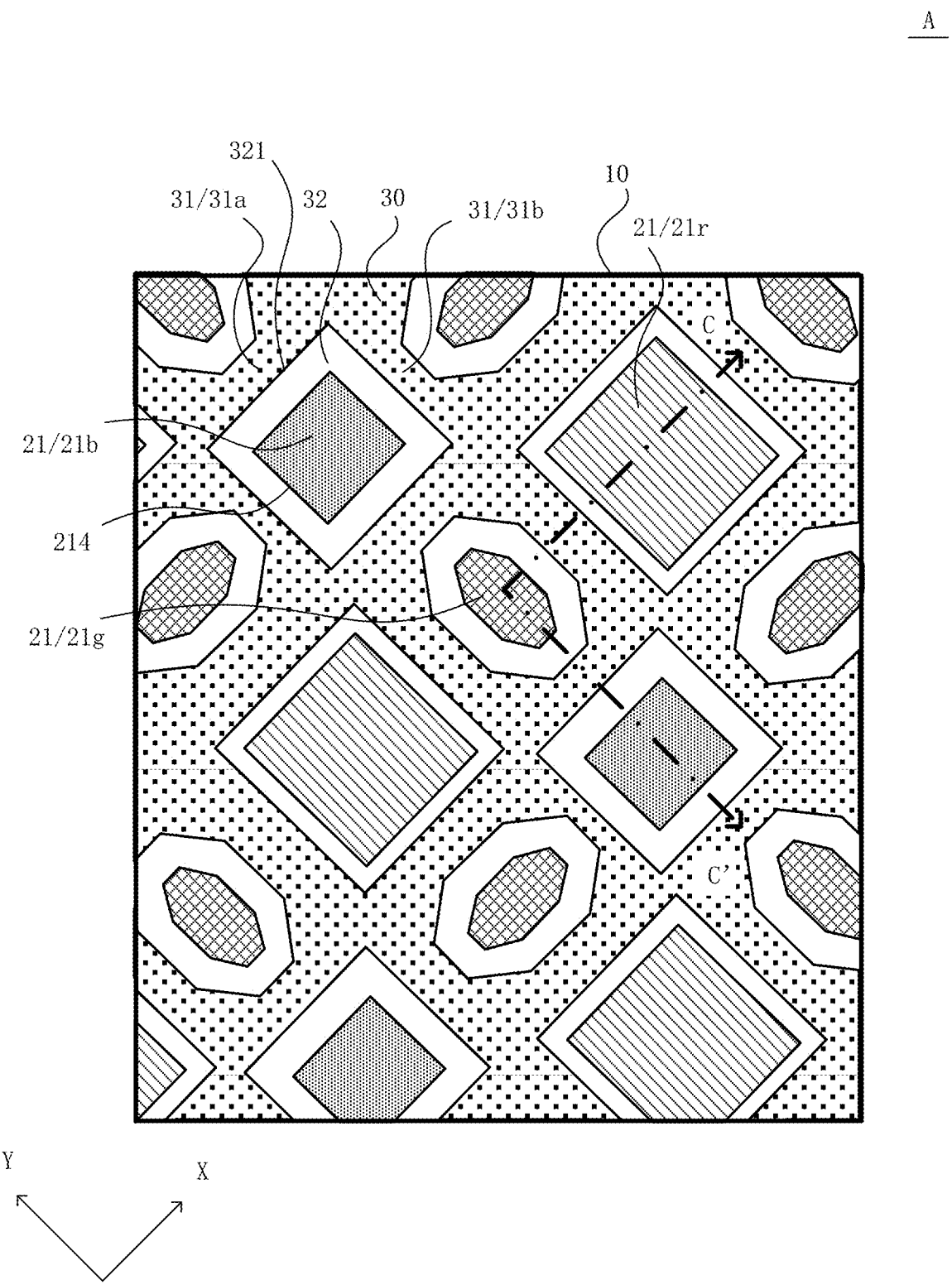
FIG. 7 illustrates another enlarged view of part A of the display panel described in FIG. 1.
Figure 8:
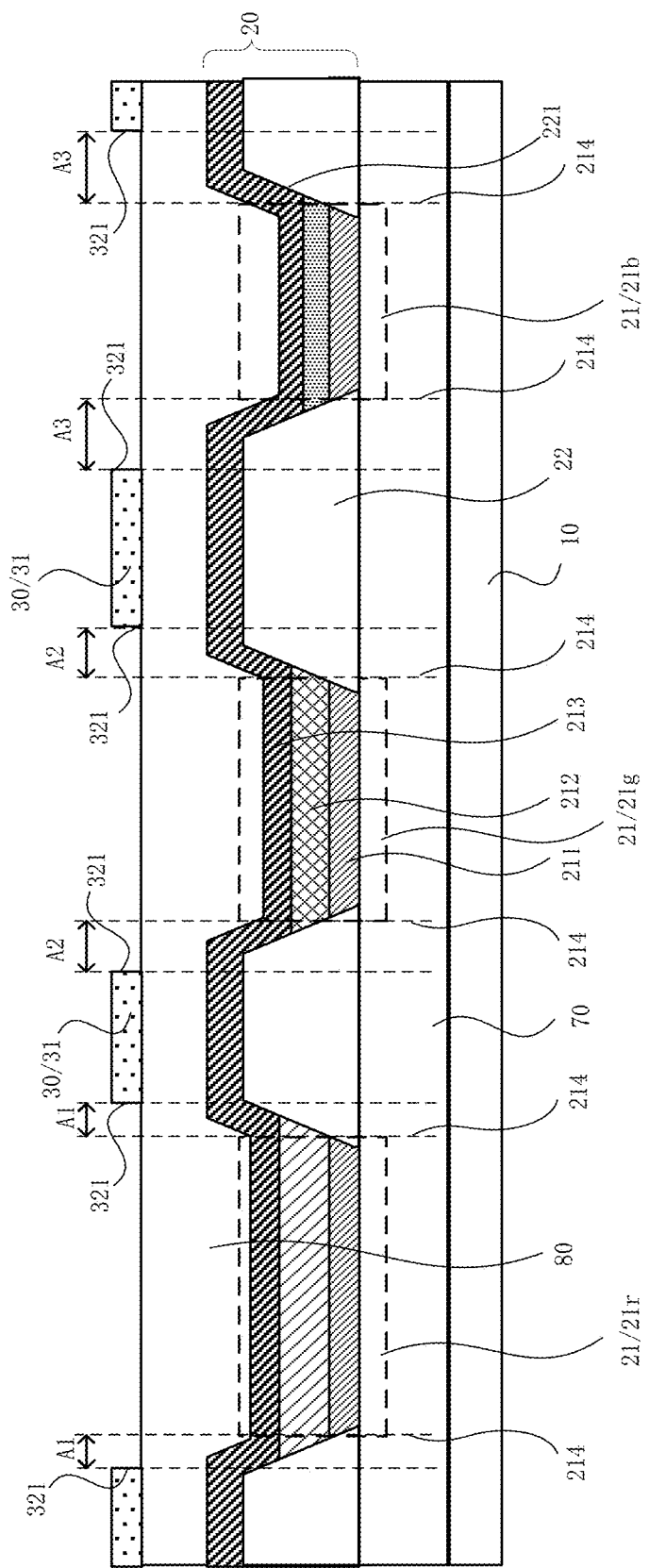
FIG. 8 illustrates a cross-sectional view of the display panel shown in FIG. 7 along C-C'.

FIG. 7 illustrates another enlarged view of part A of the display panel described in FIG. 1. FIG. 8 illustrates a cross-sectional view of the display panel shown in FIG. 7 along C-C'. Referring to FIG. 1, FIG. 7 and FIG. 8, in some optional embodiments, subpixels 21 include red subpixels 21r, blue subpixels 21b and green subpixels 21g.

A distance between an edge 214 of a vertical projection pattern of a red subpixel 21r on the plane where the base substrate 10 is located and an edge 321 of a vertical projection pattern of a corresponding hollow part 32 on the plane where the base substrate 10 is located is A1. A distance between an edge 214 of a vertical projection pattern of a green subpixel 21g on the plane where the base substrate 10 is located and an edge 321 of a vertical projection pattern of a corresponding hollow part 32 on the plane where the base substrate 10 is located is A1. A distance between an edge 214 of a vertical projection pattern of a blue subpixel 21b on the plane where the base substrate 10 is located and an edge 321 of a vertical projection pattern of a corresponding hollow part 32 on the plane where the base substrate 10 is A1. And A1<A2<A3.

Specifically, subpixels 21 include red subpixels 21r, blue subpixels 21b and green subpixels 21g. Along a direction perpendicular to the plane where the base substrate 10 is located, there are differences in thicknesses of a red subpixel 21r, a blue subpixels 21b and a green subpixel 21g. Specifically, along the direction perpendicular to the plane where the base substrate 10 is located, a thickness of the light-emitting layer 212 in the red subpixel 21r is greater than a thickness of the light-emitting layer 212 in the green subpixel 21g, and the thickness of the light-emitting layer 212 in the green subpixel 21g is greater than a thickness of the light-emitting layer 212 in the blue subpixels 21b, so that along the direction perpendicular to the plane where the base substrate 10 is located, the thickness of the red subpixel 21r is greater than the thickness of the green subpixel 21g, and the thickness of the green subpixel 21g is greater than the thickness of a blue subpixel 21b.

Along the direction perpendicular to the plane where the base substrate 10 is located, the thickness of the red subpixel 21r is greater than the thickness of the green subpixel 21g. The distance between an edge 214 of a vertical projection pattern of the blue subpixel 21r on the plane where the base substrate 10 is located and an edge 321 of a vertical projection pattern of a corresponding hollow part 32 on the plane where the base substrate 10 is arranged to be smaller than the distance between an edge 214 of a vertical projection pattern of the green subpixel 21g on the plane where the base substrate 10 is located and an edge 321 of a vertical projection pattern of a corresponding hollow part 32 on the plane where the base substrate 10, so that luminous effects of the red subpixel 21r and the green subpixel 21g tend to be the same at a non-main viewing angle, avoiding a color shift at the non-main viewing angle.

Similarly, along the direction perpendicular to the plane where the base substrate 10 is located, the thickness of the green subpixel 21g is greater than the thickness of the blue subpixel 21b. The distance between an edge 214 of a vertical projection pattern of the green subpixels 21g on the plane where the base substrate 10 is located and an edge 321 of a vertical projection pattern of a corresponding hollow part 32 on the plane where the base substrate 10 is arranged to be smaller than the distance between an edge 214 of a vertical projection pattern of blue subpixels 21b on the plane where the base substrate 10 is located and an edge 321 of a vertical projection pattern of a corresponding hollow part 32 on the plane where the base substrate 10, so that luminous effects of the green subpixel 21g and the blue subpixel 21b tend to be the same at a non-main viewing angle, avoiding a color shift at the non-main viewing angle.

Referring to FIG. 1, FIG. 7 and FIG. 8, in some optional embodiments, A1+a=A2, A2+a=A3, 0.04 µm≤a≤0.06 µm.

Specifically, along the direction perpendicular to the plane where the base substrate 10 is located, the thickness of a light-emitting layer 212 in the red subpixel 21r is greater than the thickness of the light-emitting layer 212 in the green subpixel 21g, and a difference between the thickness of the light-emitting layer 212 in the red subpixel 21r and the thickness of the light-emitting layer 212 in the green subpixels 21g is a. Accordingly, a distance between an edge 214 of a vertical projection pattern of the red subpixel 21r on the plane where the base substrate 10 is located and an edge 321 of a vertical projection pattern of a corresponding hollow part 32 on the plane where the base substrate 10 is arranged to be smaller than a distance between an edge 214 of a vertical projection pattern of a green subpixel 21g on the plane where the base substrate 10 is located and an edge 321 of a vertical projection pattern of a corresponding hollow part 32 on the plane where the base substrate 10, and a difference between the above two distances is a, so that luminous effects of the red subpixel 21r and the green subpixel 21g tend to be the same at a viewing angle of 45°, avoiding a color shift at a non-main viewing angle. Optionally, 0.04 μm≤a≤0.06 μm. Further optionally, a=0.05 μm.

Similarly, along the direction perpendicular to the plane where the base substrate 10 is located, the thickness of the light-emitting layer 212 in the green subpixel 21g is greater than the thickness of the light-emitting layer 212 in the blue subpixels 21b, and a difference between the thickness of the light-emitting layer 212 in the green subpixels 21g and the thickness of the light-emitting layer 212 in the blue subpixels 21b is a. Accordingly, the distance between an edge 214 of a vertical projection pattern of green subpixels 21g on the plane where the base substrate 10 is located and an edge 321 of a vertical projection pattern of corresponding hollow parts 32 on the plane where the base substrate 10 is arranged to be smaller than the distance between an edge 214 of a vertical projection pattern of blue subpixels 21b on the plane where the base substrate 10 is located and an edge 321 of a vertical projection pattern of corresponding hollow parts 32 on the plane where the base substrate 10, and the difference between the above distances is a, so that luminous effects of the green subpixel 21g and the blue subpixel 21b tend to be the same at a viewing angle of 45°, avoiding color shift at a non-main viewing angle. Optionally, 0.04 μm≤a≤0.06 μm. Further optionally, a=0.05 μm.

It should be noted that the embodiment exemplarily shows that to realize that luminous effects of the red subpixel 21r, the blue subpixel 21b and the green subpixel 21g tend to be consistent at a viewing angle of 45°, thereby setting A1+a=A2, A2+a=A3. Along the direction perpendicular to the plane where the base substrate 10 is located, the thickness of the light-emitting layer 212 in the red subpixel 21r is greater than the thickness of the light-emitting layer 212 in the green subpixel 21g, and a difference between the thickness of the light-emitting layer 212 in the red subpixel 21r and the thickness of the light-emitting layer 212 in the green subpixel 21g is a, the thickness of the light-emitting layer 212 in the green subpixel 21g is greater than the thickness of the light-emitting layer 212 in the blue subpixel 21b, and a difference between the thickness of the light-emitting layer 212 in the green subpixel 21g and the thickness of the light-emitting layer 212 in the blue subpixels 21b is a. Based on a same principle, in order to realize that the luminous effects of the red subpixel 21r, the blue subpixels 21b and the green subpixels 21g tend to be consistent at another viewing angle. In other embodiments, a difference between A1 and A2, and a difference between A2 and A3 can be adjusted accordingly, which are not repeated herein.

It should be noted that the embodiment exemplarily shows that 0.04 μm≤a≤ 0.06 μm. In other embodiments, a value of a can be set according to thickness differences of the red subpixel 21r, the blue subpixel 21b and the green subpixel 21g along the direction perpendicular to the plane of the base substrate 10 in an actual product, which are not repeated herein.

Figure 9:
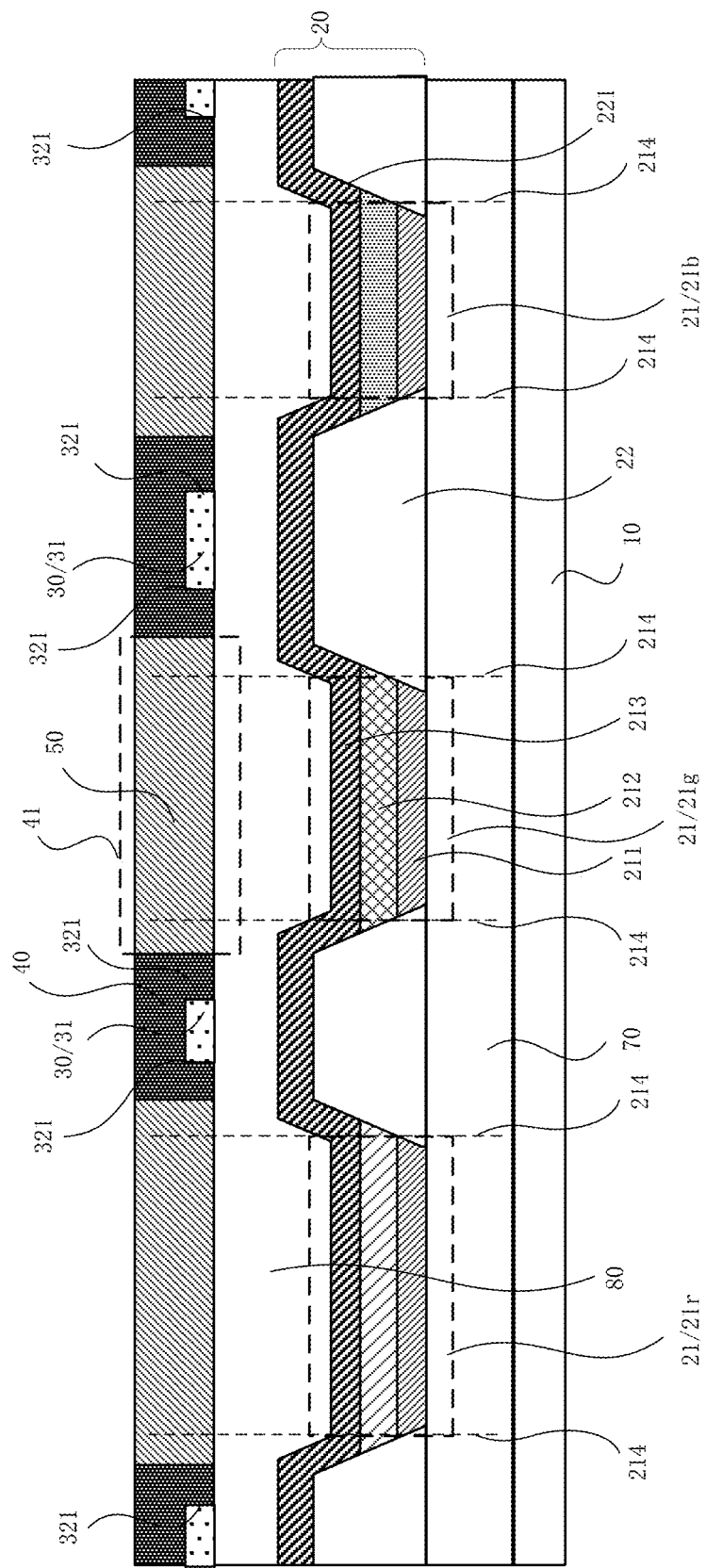
FIG. 9 illustrates a schematic diagram of another display panel consistent with various embodiments of the present disclosure.

FIG. 9 illustrates a schematic diagram of another display panel consistent with various embodiments of the present disclosure. Referring to FIG. 9, in some optional embodiments, the display panel further includes a light-shielding layer 40 on the side of the display function layer 20 away from the base substrate 10. The light shielding layer 40 includes a plurality of first openings 41, and a vertical projection of the subpixels 21 on the plane where the base substrate 10 is located within a vertical projection of the first openings 41 on the plane where the base substrate 10 is located.

Specifically, the display panel further includes the light-shielding layer 40 on the side of the display function layer 20 away from the base substrate 10, and the light-shielding layer 40 is on the side of the encapsulation layer 80 away from the base substrate 10. The light-shielding layer 40 may be made of a light-shielding material, that is, the light-shielding layer 40 may be made of a material that generally absorbs a wavelength of about 380 nm to about 780 nm. Therefore, the light shielding layer 40 may have a color close to gray or black. For example, the light-shielding layer 40 may include a resin or paste (including carbon black, carbon nanotubes, or black dye), metal particles (e.g., nickel, aluminum, molybdenum, or any alloy thereof), metal oxide particles (e.g., chromium oxide) or metal nitride particles (e.g., chromium nitride). The light shielding layer 40 can absorb external light incident on the display panel, and absorb reflected light reflected from the display panel, thereby improving a display effect of the display panel.

The display panel further includes a plurality of color resists 50, the light-shielding layer 40 includes a plurality of first openings 41, and the plurality of color resists 50 are arranged in the plurality of first openings 41. A vertical projection of a subpixel 21 on the plane where the base substrate 10 is located within a vertical projection of a first opening 41 on the plane where the base substrate 10 is located, so that the vertical projection of the subpixel 21 on the plane where the base substrate 10 is located within a vertical projection of a color resist 50 on the plane where the base substrate 10 is located. The subpixels 21 of different colors correspond to the color resists 50 of different colors, so that light of different colors can be transmitted through the color resists 50 corresponding to the subpixels, and light of different colors can be absorbed. Exemplarily, light emitted by a red subpixel 21r can be transmitted through a red color resist 50, light emitted by a green subpixel 21g can be transmitted through a green color resist 50, and light emitted by a blue subpixel 21b can be transmitted through a blue color resist 50.

A color resist 50 can reduce an external light reflectance. Specifically, the color resist 50 may not absorb light emitted by a corresponding subpixel 21, but at a same time, may also absorb reflected light that differs in color from light emitted by the corresponding subpixel 21 in reflected light that enters the display panel from outside.

Optionally, when there are subpixels 21 of different sizes in the display panel, sizes of the first openings 41 corresponding to the subpixels 21 of different sizes are also different. That is, sizes of the color resists 50 corresponding to the subpixels 21 of different sizes are also different, and a size of a first opening 41 corresponding to a subpixel 21 with a larger size is also larger. Accordingly, a sizes of a color resist 50 corresponding to a subpixel 21 with a larger size is also larger.

Referring to FIG. 9, in some optional embodiments, the light shielding layer 40 covers the touch electrodes 30.

Specifically, the touch electrodes 30 can be arranged in the light-shielding layer 40 to effectively avoid a problem that the touch electrodes 30 are visible due to reflection of an external light incident on the touch electrodes 30, which is conducive to improving a display effect. At a same time, arranging the touch electrodes 30 in the light shielding layer 40 is conducive to reducing a thickness of the display panel.

Figure 10:
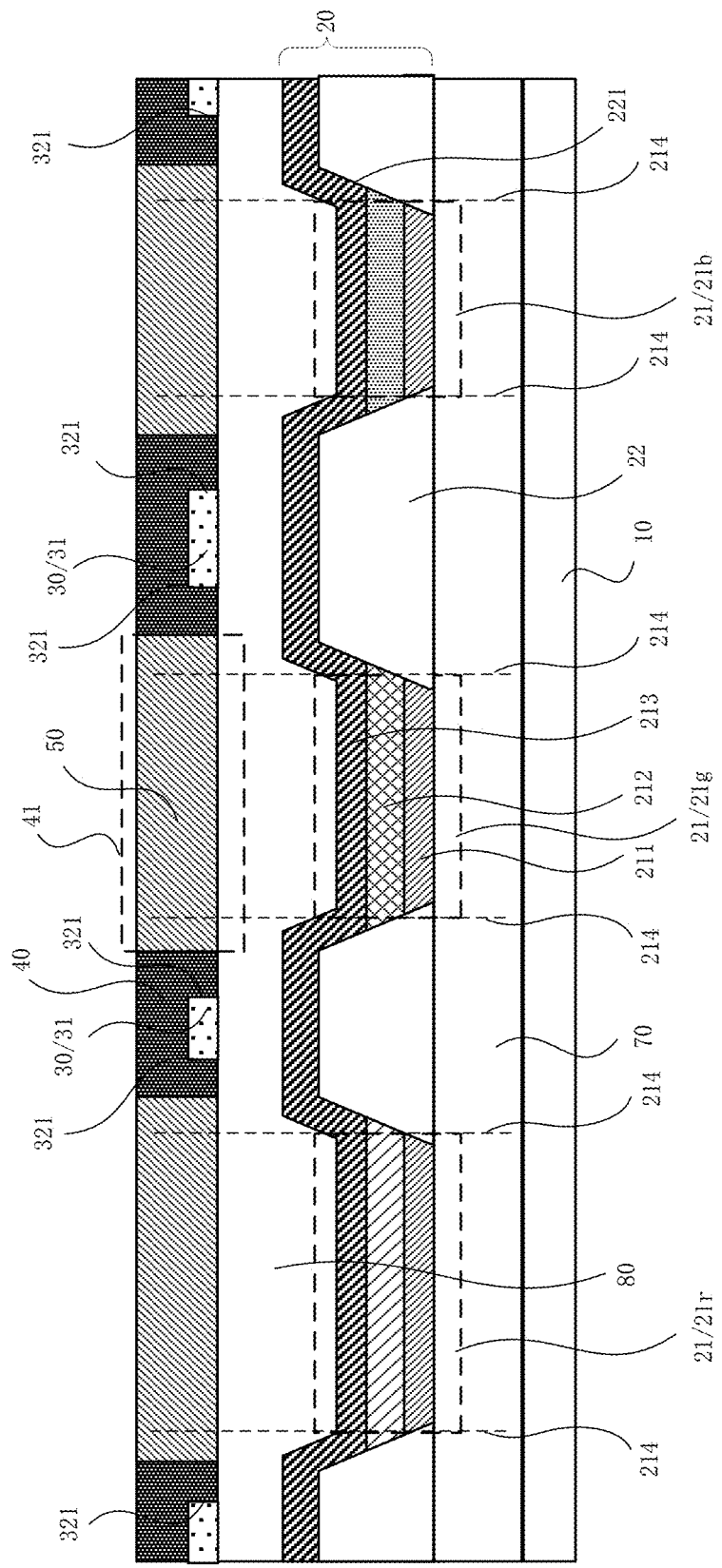
FIG. 10 illustrates a schematic diagram of another display panel consistent with various embodiments of the present disclosure.

FIG. 10 illustrates a schematic diagram of another display panel consistent with various embodiments of the present disclosure. Referring to FIG. 10, in some optional embodiments, the display panel further includes a light adjustment layer 60 on the side of the display function layer 20 away from the base substrate 10. The light adjustment layer 60 includes a plurality of refraction structures 61, and a refraction film 62 covering the plurality of refraction structures 61. A vertical projection of a refraction structure 61 on the plane where the base substrate 10 is located does not overlap a vertical projection of a subpixel 21 on the plane where the base substrate 10 is located. A refractive index of the refractive structure 61 is lower than a refractive index of the refractive film 62.

Specifically, the display panel further includes a light adjustment layer 60 on the side of the encapsulation layer 80 away from the base substrate 10. The light adjustment layer 60 includes a plurality of refraction structures 61, and a refraction film 62 covering the plurality of refraction structures 61. The refraction film 62 is usually made of a transparent material. The vertical projection of the refraction structure 61 on the plane where the base substrate 10 is located does not overlap a vertical projection of a subpixel 21 on the plane where the base substrate 10 is located, so that a setting of the light adjustment layer 60 does not affect light transmission of the display panel at a normal viewing angle.

The refractive index of the refraction structure 61 is lower than the refractive index of the refraction film 62, so that light at a large viewing angle emitted by the subpixel 21 is totally reflected at a cross section between the refraction structure 61 and the refraction film 62, light is deflected toward a direction close to a normal viewing angle, to increase an amount of light at the normal viewing angle in the display panel, which is conducive to improving a display effect of the display panel.

Referring to FIG. 10, in some optional embodiments, the refraction structure 61 covers the touch electrodes 30.

Specifically, since light at a large viewing angle emitted by the subpixel 21 is totally reflected at the cross section between the refraction structure 61 and the refraction film 62, the light is deflected towards a direction close to a normal viewing angle. Arranging the touch electrodes 30 on the refraction structures 61 can effectively reduce an amount of light incident on the touch electrodes 30, thereby reducing a reflection of the light from the subpixels 21 at large viewing angles on the touch electrodes 30. At a same time, the touch electrodes 30 can be arranged in the refraction structures 61, which is conducive to reducing the thickness of the display panel.

Figure 11:
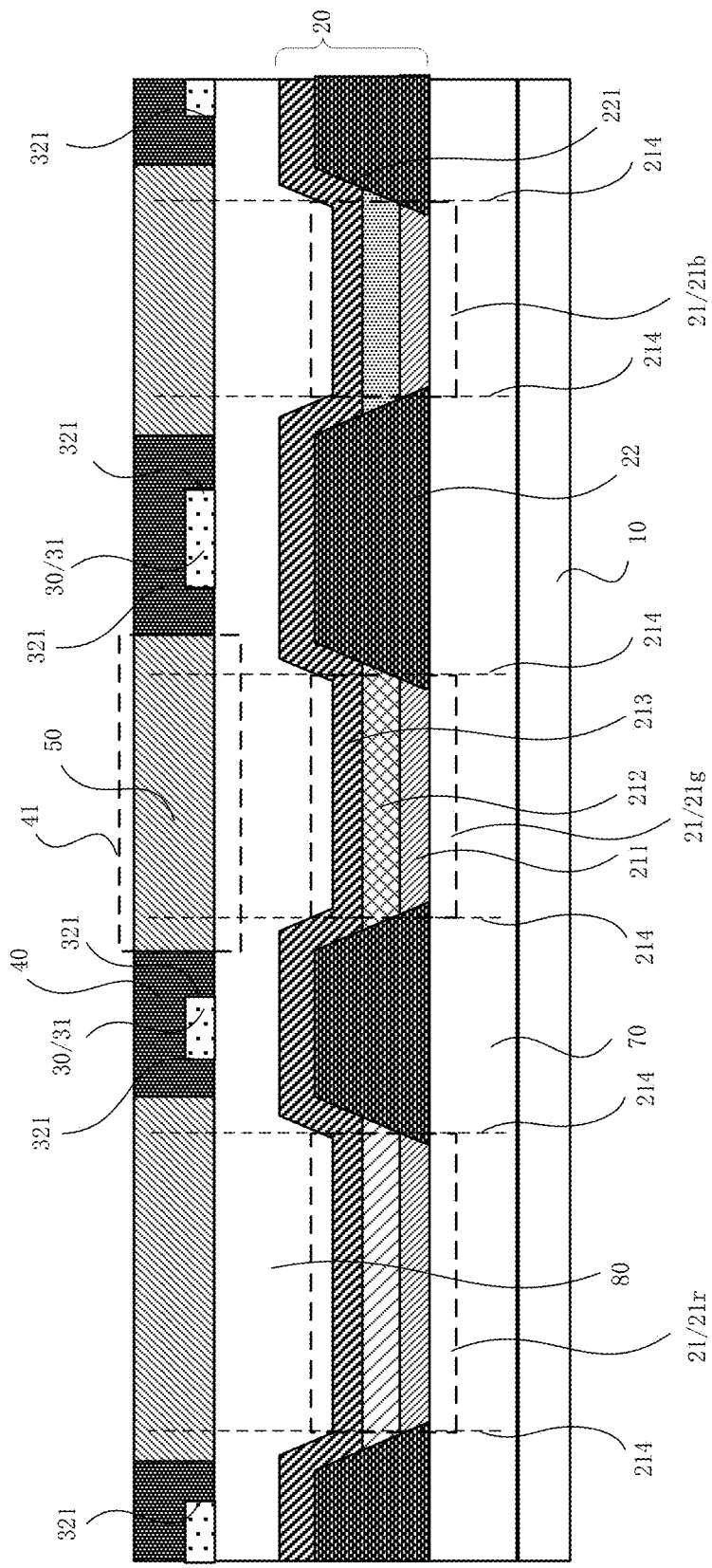
FIG. 11 illustrates a schematic diagram of another display panel consistent with various embodiments of the present disclosure.

FIG. 11 illustrates a schematic diagram of another display panel consistent with various embodiments of the present disclosure. Referring to FIG. 11, in some optional embodiments, the display panel also includes a pixel definition layer 22 including a plurality of second openings 221, and the subpixels 21 are in the second openings 221. Vertical projections of the touch electrodes 30 on the plane where the base substrate 10 is located within a vertical projection of the pixel definition layer 22 on the plane where the base substrate 10 is located. A material of the pixel definition layer 22 is a light-shielding material.

Specifically, the vertical projections of the touch electrodes 30 on the plane where the base substrate 10 is located within the vertical projection of the pixel definition layer 22 on the plane where the base substrate 10 is located, and the material of the pixel definition layer 22 is a light-shielding material. That is, the pixel definition layer 22 may include a material that generally absorbs a wavelength of about 380 nm to about 780 nm. Therefore, the pixel definition layer 22 may have a color close to gray or black. The pixel definition layer 22 can absorb light reflected from subpixels 21 on the touch electrodes 30, thereby improving a display effect of the display panel.

Figure 12:
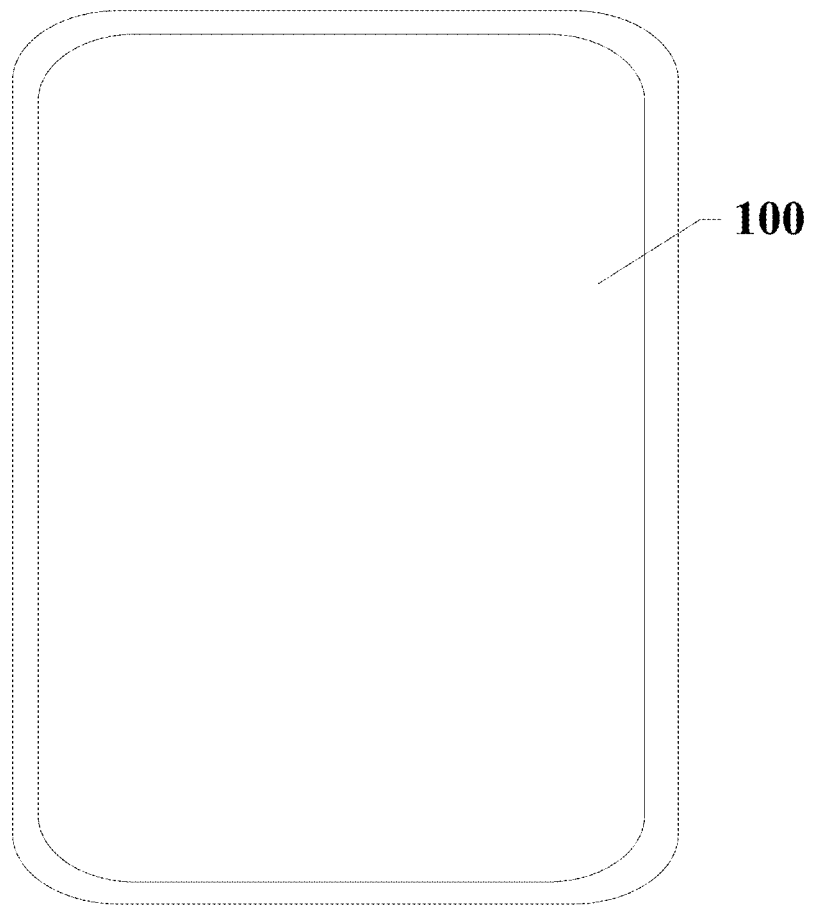
FIG. 12 illustrates a planar view of a display device consistent with various embodiments of the present disclosure.

FIG. 12 illustrates a planar view of a display device consistent with various embodiments of the present disclosure. Referring to FIG. 12, in some optional embodiments, a display device 10000 includes a display panel 100 provided by any one of the above embodiments of the present disclosure. The embodiment in FIG. 12 only uses a mobile phone as an example to illustrate a display device 1000. It can be understood that the display device 1000 provided in the embodiment may also be a display device 1000 with a display function such as a computer, a television, a vehicle-mounted display device or the like, which is not limited herein. The display device provided by the embodiment has the beneficial effects of the display panel provided by any one of the above embodiments. For details, reference may be made to the specific descriptions of the display panel in the above embodiments, which is not repeated herein.

As disclosed, the display panel and the display device provided by the present disclosure at least realize the following beneficial effects.

In the display panel provided by the present disclosure, along the first direction or along the second direction, there are the distance D1 between two adjacent subpixels, and the distance D2 between the two adjacent subpixels, and D1>D2. That is, along the first direction or along the second direction, there is a difference in distances between two adjacent subpixels in the display panel, that is, along the first direction or along the second direction, distances between part of two adjacent subpixels are larger than distances between another part of two adjacent subpixels. Along the first direction or along the second direction, a minimum width of touch wires between the two adjacent subpixels with a distance of D1 is d1, and a minimum width of the touch wires between the two adjacent subpixels with a distance of D2 is d2, and d1>d2. That is, along the first direction or along the second direction, when a distance between two adjacent subpixels in the display panel is larger, a minimum width of touch wires between the two adjacent subpixels is also set larger, which can increase widths of part of touch wires in the touch electrodes, and is conducive to reducing resistances of the touch electrodes, increasing a sensing amount of a touch signal, and improve a touch performance.

Although specific embodiments of the present disclosure have been described in detail by way of examples, a person skilled in the art should understand that the above embodiments are for illustration only, rather than limiting the scope of the present disclosure. A person skilled in the art can make modifications without departing from the scope and spirit of the present disclosure. The scope of the present disclosure is defined by the appended claims.

What is claimed is:

1. A display panel, comprising:
   a base substrate;
   a display function layer, on a side of the base substrate, the display function layer including a plurality of subpixels arranged in an array along a first direction and a second direction, and the first direction intersects the second direction;
   touch electrodes, on a side of the display function layer away from the base substrate, the touch electrodes including a plurality of touch wires intersecting to form a grid with a plurality of hollow parts, a vertical projection of a subpixel of the plurality of subpixels on a plane where the base substrate is located within a vertical projection of a hollow part of the plurality of hollow parts on the plane where the base substrate is located;
   along the first direction or along the second direction, there being a situation where a distance between two adjacent subpixels is D1, and a minimum width of touch wires between the two adjacent subpixels is d1;

along the first direction or along the second direction, there being another situation where a distance between the two adjacent subpixels is D2, and a minimum width of the touch wires between the two adjacent subpixels is d2; and $$D1 > D2 > \text{ and } d1 > d2.$$

2. The display panel according to claim 1, wherein:

the plurality of subpixels include first subpixels, second subpixels and third subpixels;

a length of at least one of the first subpixels in the first direction greater than a length thereof in the second direction; along the first direction, a subpixel adjacent to a first subpixel of the first subpixels is a second subpixel of the second subpixels, and along the second direction, and a subpixel adjacent to the first subpixel of the first subpixels is a third subpixel of the third subpixels;

a distance between the first subpixel and the adjacent second subpixel in the first direction is D11, a distance between the first subpixel and the third subpixel adjacent to the first subpixel in the second direction is D21, a minimum width of touch wires between the first subpixel and the second subpixel adjacent to the first subpixel in the first direction is d11, a minimum width of touch wires between the first subpixel and the third subpixel adjacent to the first subpixel in the second direction is d21; and $$D11 < D21, d11 < d21.$$

3. The display panel according to claim 2, wherein:

a vertical projection pattern of the first subpixel on the plane where the base substrate is located is an ellipse or a rectangle.

4. The display panel according to claim 2, further comprising a plurality of pixel units, and a pixel unit of the plurality of pixel units comprising two first subpixels, one second subpixel and one third subpixel, wherein:

in the pixel unit, the second subpixel and one of the two first subpixels are arranged along the first direction, the second subpixel and the other of the two first subpixels are arranged along the second direction, the third subpixel and one of the two first subpixels are arranged along the first direction, and the third subpixel and the other of the two first subpixels are arranged along the second direction.

5. The display panel according to claim 2, wherein:

the first subpixel, the second subpixel, and the third subpixel are different ones of a red subpixel, a blue subpixel, and a green subpixel.

6. The display panel according to claim 1, wherein:

along the first direction, a distance between an edge of a vertical projection pattern of the subpixel of the plurality of subpixels on the plane where the base substrate is located and an edge of a vertical projection pattern of a corresponding hollow part on the plane where the base substrate is S1;

along the second direction, a distance between an edge of a vertical projection pattern of the subpixel on the plane where the base substrate is located and an edge of a vertical projection pattern of a corresponding hollow part on the plane where the base substrate is S2;

along a third direction, a distance between an edge of a vertical projection pattern of the subpixel on the plane where the base substrate is located and an edge of a vertical projection pattern of a corresponding hollow part on the plane where the base substrate is S3; and the third direction intersects the first direction, the third direction intersects the second direction, and S1=S2=S3.

7. The display panel according to claim 6, wherein:

the hollow parts correspond to the subpixels one by one, an edge shape of a vertical projection pattern of a subpixel on the plane where the base substrate is located is same as an edge shape of the vertical projection pattern of a corresponding hollow part on the plane where the base substrate is located; and a vertical projection pattern of the subpixel on the plane where the base substrate is located is a polygon.

8. The display panel according to claim 6, wherein:

along each direction parallel to the plane of the base substrate, distances between an edge of a vertical projection pattern of the subpixel on the plane where the base substrate is located and a vertical direction of a corresponding hollow part on the plane where the base substrate are same.

9. The display panel according to claim 6, wherein:

the plurality of subpixels include fourth subpixels and fifth subpixels;

an area of a vertical projection pattern of a fourth subpixel of the fourth subpixels on the plane where the base substrate is located is larger than an area of a vertical projection pattern of a fifth subpixel of the fifth subpixels on the plane where the base substrate is located;

an area of a vertical projection pattern of a hollow part corresponding to the fourth subpixel on the plane where the base substrate is located is larger than an area of a vertical projection pattern of a hollow part corresponding to the fifth subpixel on the plane where the base substrate is located.

10. The display panel according to claim 6, wherein:

an distance between an edge of a vertical projection pattern of each subpixel on the plane where the base substrate is located and an edge of a vertical projection pattern of a corresponding hollow part on the plane where the base substrate is located is same.

11. The display panel according to claim 6, wherein:

a distance between an edge of a vertical projection pattern of the subpixel on the plane where the base substrate is located and an edge of a vertical projection pattern of a corresponding hollow part on the plane where the base substrate is located is L, and 8 µm≤L≤10 µm.

12. The display panel according to claim 6, wherein:

the plurality of subpixels include red subpixels, blue subpixels and green subpixels;

a distance between an edge of a vertical projection pattern of a red subpixel of the red subpixels on the plane where the base substrate is located and an edge of a vertical projection pattern of a corresponding hollow part on the plane where the base substrate is located is A1, a distance between an edge of a vertical projection pattern of a green subpixel of the green subpixels on the plane where the base substrate is located and an edge of a vertical projection pattern of a corresponding hollow part on the plane where the base substrate is located is A2, a distance between an edge of a vertical projection pattern of a blue subpixel of the blue subpixels on the plane where the base substrate is located and an edge of a vertical projection pattern of a corresponding hollow part on the plane where the base substrate is located is A3; and $$A1 < A2 < A3.$$

13. The display panel according to claim 12, wherein A1+a=A2, A2+a=A3, 0.04 μm≤a≤0.06 μm.

14. The display panel according to claim 1, further comprising a light-shielding layer on a side of the display function layer away from the base substrate, wherein:
the light-shielding layer includes a plurality of first openings, and a vertical projection of the subpixels on the plane where the base substrate is located within a vertical projection of the first openings on the plane where the base substrate is located.

15. The display panel according to claim 14, wherein the light-shielding layer covers the touch electrodes.

16. The display panel according to claim 1, further comprising a light adjustment layer on a side of the display function layer away from the base substrate, wherein:
the light adjustment layer includes a plurality of refraction structures and a refraction film covering the plurality of refraction structures, a vertical projection of a refraction structure of the plurality of refraction structures on the plane where the base substrate is located does not overlap a vertical projection of a subpixel of the plurality of subpixels s on the plane where the base substrate is located; and
a refractive index of the refraction structure is lower than a refractive index of the refraction film.

17. The display panel according to claim 16, wherein the plurality of refraction structures covers the touch electrodes.

18. The display panel according to claim 1, further comprising a pixel definition layer comprising a plurality of second openings, and the subpixels being in the second openings wherein:
vertical projections of the touch electrodes on the plane where the base substrate is located are within a vertical projection of the pixel definition layer on the plane where the base substrate is located; and
a material of the pixel definition layer is a light-shielding material.

19. A display device, comprising a display panel comprising:
a base substrate;
a display function layer, on a side of the base substrate, the display function layer including a plurality of subpixels arranged in an array along a first direction and a second direction, and the first direction intersects the second direction;
touch electrodes, on a side of the display function layer away from the base substrate, the touch electrodes including a plurality of touch wires intersecting to form a grid with a plurality of hollow parts, a vertical projection of a subpixel of the plurality of subpixels on a plane where the base substrate is located within a vertical projection of a hollow part of the plurality of hollow parts on the plane where the base substrate is located;
along the first direction or along the second direction, there being a situation where a distance between two adjacent subpixels is D1, and a minimum width of touch wires between the two adjacent subpixels is d1;
along the first direction or along the second direction, there being another situation where a distance between the two adjacent subpixels is D2, and a minimum width of the touch wires between the two adjacent subpixels is d2; and $$D1 > D2 > \text{ and } d1 > d2.$$

\* \* \* \* \*